United States Patent [19]

Kinugawa et al.

[11] 4,289,100
[45] Sep. 15, 1981

[54] APPARATUS FOR CONTROLLING ROTATION SPEED OF ENGINE

[75] Inventors: Masumi Kinugawa; Norio Omori; Motoharu Sueishi, all of Kariya, Japan

[73] Assignee: Nippondenso Co., Ltd., Kariya, Japan

[21] Appl. No.: 971,215

[22] Filed: Dec. 20, 1978

[30] Foreign Application Priority Data

Jan. 20, 1978 [JP] Japan .................... 53-5362
Jan. 20, 1978 [JP] Japan ................ 53-5783[U]

[51] Int. Cl.³ .............................................. F02D 9/02
[52] U.S. Cl. ................................ 123/339; 62/323.1; 74/860; 123/360; 123/585
[58] Field of Search ............... 123/102, 124 B, 119 D; 62/243, 323; 74/860

[56] References Cited

U.S. PATENT DOCUMENTS

| | | | |
|---|---|---|---|
| 3,103,128 | 9/1963 | Gordon | 123/102 |
| 3,146,844 | 9/1964 | Carlson | 123/102 |
| 3,252,539 | 5/1966 | Ott et al. | 123/102 X |
| 3,253,774 | 5/1966 | Dietrich | 123/102 X |
| 3,724,230 | 4/1973 | Muto et al. | 123/102 X |
| 4,161,928 | 7/1979 | Teague et al. | 123/102 |
| 4,181,104 | 1/1980 | Shinoda | 123/102 |
| 4,191,051 | 3/1980 | Kawata et al. | 123/102 X |
| 4,203,395 | 5/1980 | Cromas et al. | 123/102 X |

FOREIGN PATENT DOCUMENTS 2523283  1/1976  Fed. Rep. of Germany ...... 123/102

Primary Examiner—Tony M. Argenbright
Attorney, Agent, or Firm—Cushman, Darby & Cushman

[57] ABSTRACT

The amount of secondary air flowing through a bypass air passage bypassing the throttle valve of an engine, which is connected to an automatic transmission of a vehicle having an air-conditioner, is controlled by an air control valve disposed in the bypass air passage. The air control valve is controlled on the basis of the result of comparison between a signal indicative of the actual idling rotation speed of the engine detected by the distributor of the engine and a reference signal indicative of a desired idling rotation speed of the engine. The level of this reference signal indicative of the desired idling rotation speed of the engine varies depending on the on-off of the air-conditioner in the vehicle or on the position of the shift lever of the automatic transmission.

7 Claims, 11 Drawing Figures

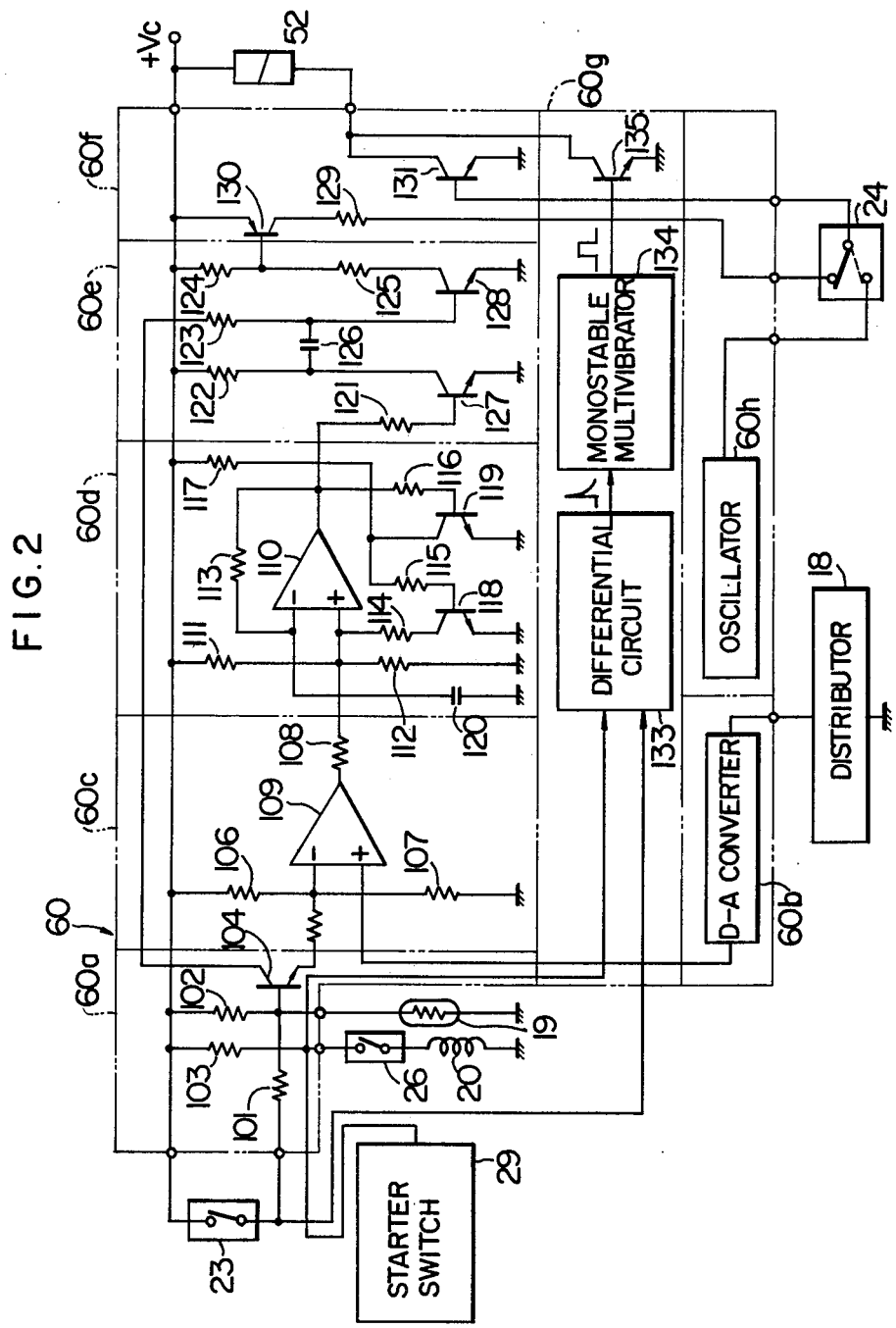
F I G. 2

APPARATUS FOR CONTROLLING ROTATION SPEED OF ENGINE

This invention relates to an apparatus for conrolling the rotation speed of an internal combustion engine mounted on a vehicle having an air-conditioner, and more particularly to an apparatus for controlling the idling rotation speed of an internal combustion engine of the spark ignition type mounted on a vehicle.

The idling rotation speed of an internal combustion engine of the spark ignition type mounted on a vehicle is desirably controlled to be higher in a cold state than that in a warm state in order to shorten the length of time required for warming up the engine from its cold state.

An apparatus constructed to serve the above purpose is commonly known and is employed in a vehicle having an air-conditioner and driven by an internal combustion engine of the spark ignition type connected to an automatic transmission of the vehicle. The known apparatus comprises a bypass air conduit bypassing the throttle valve of the engine and an air control valve of bimetal type disposed midway of this bypass air conduit. In the known apparatus, the amount of secondary air flowing through this bypass air conduit is regulated depending on the temperature of the engine so as to control the amounts of air and fuel in the air-fuel mixture supplied to the engine thereby controlling the idling rotation speed of the engine.

However, this prior art apparatus, in which the temperature of the engine is the single paramater used for the control of the idling rotation speed of the engine, cannot compensate for changes in lubricating oil viscosity. When a specific kind of engine lubricating oil is replaced by another kind of engine lubricating oil, the designed high idling rotation speed would not be attained, and rather, an idling rotation speed higher than the designed value tends to be developed due to the viscosity difference between the two kinds of lubricating oil.

The prior art apparatus also does not compensate for an abrupt variation of the load of the engine in its idling rotation condition, as when the compressor of the air-conditioner is added to the load of the engine or when the position of the shift lever of the transmission of an vehicle provided with an automatic transmission is shifted to the "D (drive)" range from the "P (park)" range or from the "N (neutral)" range; results in a momentary decrease of the rotaion speed of the engine so that the vehicle driver will feel uneasy or unpleasant for that moment.

With a view to obviate the aforementioned shortcomings of the prior art apparatus, it is an object of the present invention to provide a novel and improved apparatus for controlling the idling rotation speed of such an engine in which means are provided for accurately controlling the idling rotation speed of the engine at the designed value even when a specific kind of engine lubricating oil is replaced by another kind of engine lubricating oil having a different viscosity.

Another object of the present invention is to provide an apparatus of the above character in which means are provided for preventing the undesirable decrease in the idling rotation speed of the engine even when an abrupt variation occurs in the load of the engine.

These and other objects, features and advantages of the present invention will be apparent from the following detailed description taken in conjunction with the accompanying drawings, in which:

FIG. 2 is an electrical circuit diagram showing the detailed structure of the electronic air control unit shown in FIG. 1;

Preferred embodiments of the apparatus according to the present invention will now be described in detail with reference to the drawings.

Figure 1:
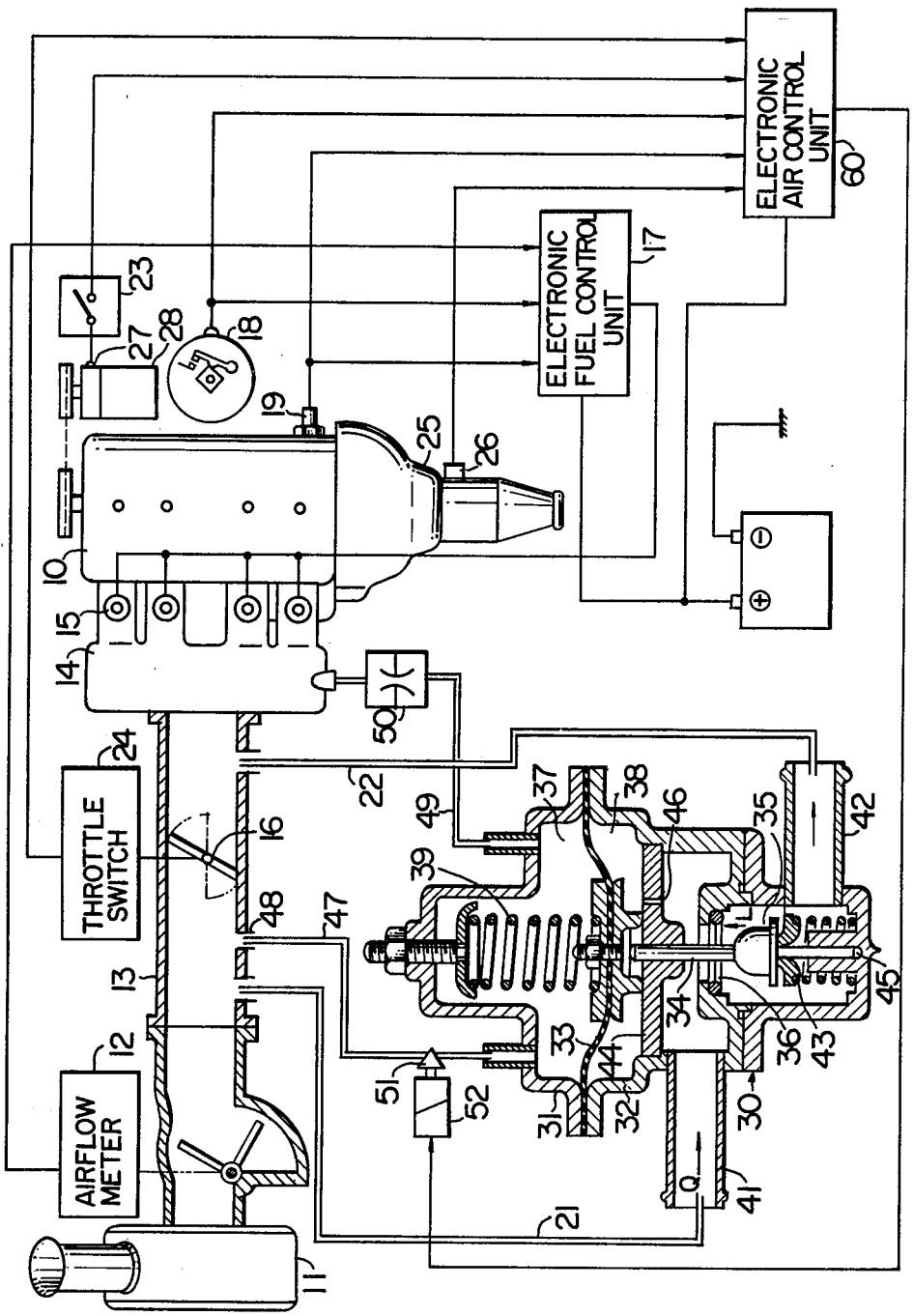
FIG. 1 is a diagrammatic view showing the general structure of an embodiment of the apparatus according to the present invention.

Referring to FIG. 1 of the drawings, the reference numeral 10 designates a known four-cycle internal combustion engine of spark ignition type connected to an automatic transmission 25 for driving a vehicle having an air-conditioner such as a cooler not shown. Primary air is supplied to the engine 10 through an air cleaner 11, an air flow meter 12, an intake pipe 13 and an intake manifold 14, and fuel such as gasoline is injected from a plurality of electromagnetic fuel injection valves 15 disposed in the intake manifold 14.

The amount of primary air supplied to the engine 10 is regulated by a freely actuated throttle valve 16, while the amount of fuel is regulated by an electronic fuel control unit 17. This electronic fuel control unit 17 is of the type commonly known in the art, in which the rotation speed of the engine detected by an ignition distributor 18 functioning as an engine rotation speed sensor and the amount of intake air measured by the air flow meter 12 are used as the basic parameters for determining the amount of fuel to be injected. Another signal is also applied to the electronic fuel control unit 17 from a warm-up sensor 19 detecting the temperature of engine cooling water, so that the electronic fuel control unit 17 can also control the rate of increase or decrease in the amount of fuel to be injected.

The reference numeral 100 designates a pressure control unit controlling the pressure of air utilizing the negative pressure or vacuum in the intake manifold 14. Air conduits 21 and 22 extend from the intake pipe 13 to bypass the throttle valve 16, and an air control valve 30 is connected between these two conduits 21 and 22. One end of the air conduit 21 is connected to an air inlet port formed in the wall of the intake pipe 13 between the throttle valve 16 and the air flow meter 12, and one end of the other air conduit 22 is connected to an air outlet port formed in the wall of the intake pipe 13 at a position downstream of the throttle valve 16.

The air control valve 30 is of the diaphragm type in which the axial movement of a diaphragm 33 sandwiched at its outer peripheral edge between valve housing portions 31 and 32 is transmitted to a valve member 35 fixed to a shaft 34 so as to move the valve member 35 toward and away from an associated valve seat 36. The diaphragm 33 is displaced by the pressure difference between a diaphragm chamber 37 and an atmospheric pressure chamber 38 and is normally biased by a compression spring 39 in a direction in which the valve member 35 is urged away from the valve seat 36.

The valve member 35 is basically a needle valve member, and the flow restricting area defined between it and the valve seat 36 is continuously varied in proportion to the displacement of the diaphragm 33, hence, depending on the internal pressure of the diaphragm chamber 37 so as to regulate the flow rate Q of secondary air flowing from an inlet pipe 41 toward an outlet pipe 42. It will be noted that this valve member 35 is disposed to move in a direction reverse to the direction of movement of a conventional needle valve member and is normally biased by a relatively weak compression spring 43 in a direction in which the valve member 35 is urged toward the valve seat 36.

Thus, the operation of this valve member 35 is entirely contrary to the usual operation of a conventional needle valve member, and the valve member 35 is urged in the valve opening direction as the internal pressure of the diaphragm chamber 37 increases toward the atmospheric pressure, while it is urged in the valve closing direction as the internal pressure of the diaphragm chamber 37 decreases toward a vacuum. The air control valve 30 is so constructed that the flow rate Q of secondary air passing therethrough varies as an exponential function of the stroke L of upward lift of the valve member 35 from the lowermost position shown in FIG. 1, in which position the stroke of lift (the amount of displacement) of the valve member 35 is zero since the valve 30 is in the full open position.

A supporting plate 44 is fixedly mounted in the valve housing portion 32, and the shaft 34 is movably supported or guided at one end thereof in a central hole of the supporting plate 44 and at the other end thereof in a supporting hole 45 provided at the bottom of the valve housing portion 32. A port 46 of small diameter extends through the supporting plate 44 so that the atmospheric air can be admitted into the atmospheric pressure chamber 38 through this port 46.

Another conduit 47 which admits the atmospheric pressure into the diaphragm chamber 37 connects the diaphragm chamber 37 to a port 48 formed in the wall of the intake pipe 13 at a position upstream of the throttle valve 16, and another conduit 49 and an orifice 50 which admit the negative pressure or vacuum into the diaphragm chamber 37 connect the diaphragm chamber 37 to the intake manifold 14 disposed downstream of the throttle valve 16. An electromagnetic valve 51 having an electromagnetic coil 52 is disposed midway of the conduit 47 to open and close this conduit 47 as desired thereby controlling the internal pressure of the diaphragm chamber 37.

The electromagnetic valve 51 acts as an electromagnetic control means for controlling the opening of the air control valve 30 and is electrically connected to an electronic air control unit 60 which controls the energization of the electromagnetic coil 52 of the electromagnetic valve 51. This electronic air control unit 60 is electrically connected to the distributor 18, to the warm-up sensor 19, to an air-conditioner switch 23 for turning on-off the vehicle's air-conditioner such as the cooler, to a throttle switch 24, and to a safety switch 26 associated with the automatic transmission 25. Thus, an engine rotation speed signal, an engine cooling water temperature signal, a throttle position signal, an air-conditioner on-off signal, and an automatic transmission range signal are applied to the electronic air control unit 60.

When the air-conditioner switch 23 is turned on, a magnetic clutch 27 is engaged to add the compressor 28 of the vehicle's air-conditioner to the load of the engine 10. The throttle switch 24 is changed over from one position to the other in response to the full closure of the throttle valve 16, and the safety switch 26 is turned on in response to the shift of the shift lever (not shown) of the automatic transmission 25 from the "P" or "N" range to the "D" range.

Figure 3:
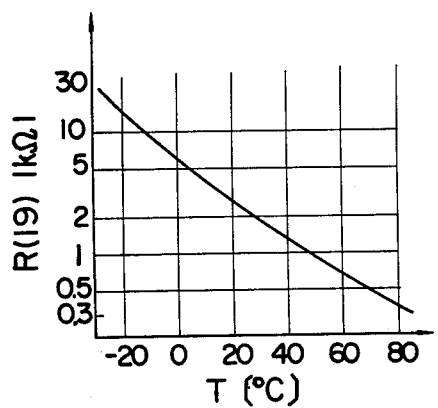
FIGS. 3, 4, 5 and 6 are graphs illustrating the operation of the electronic air control unit shown in FIG. 2.

The structure of the electronic air control unit 60 will be described in detail with reference to FIG. 2. Referring to FIG. 2, a function generator circuit 60a is connected to the warm-up sensor 19, to the air-conditioner switch 23 and to the safety switch 26 to generate a function voltage for controlling the rotation speed of the engine 10 depending on the signals applied from the warm-up sensor 19 and air-conditioner switch 23. This function generator circuit 60a is composed of resistors 101, 102, 103 and a transistor 104. The base potential of the transistor 104 in the function generator circuit 60a is given by $Vc \times R(19)/\{R(19)+R(102)\}$ in the turned-off position of the air-conditioner switch 23 and by $$Vc \times R(19)/\{R(19) + \frac{R(101) \times R(102)}{R(101) + R(102)}\}$$

in the turned-on position of the air-conditioner switch 23, where $R(19)$, $R(101)$ and $R(102)$ are the resistance values of the warm-up sensor 19 and resistors 101 and 102 respectively, and Vc is the power supply voltage. This transistor 104 is arranged to operate in the emitter follower mode, and the warm-up sensor 19 is in the form of a thermistor whose resistance value $R(19)$ varies relative to the temperature T of engine cooling water in a manner as shown in FIG. 3. Therefore, the lower the temperature T of engine cooling water, the emitter potential of the transistor 104 is higher, and the emitter potential of the transistor 104 has also a high level in the turned-on position of the air-conditioner switch 23 compared with the turned-off position of the air-conditioner switch 23.

The safety switch 26 is connected to a starter switch 29 associated with the starter for the engine 10 and also to the coil 20 of the magnetic clutch in the automatic transmission 25.

A D-A converter 60b is of the kind commonly known in the art and converts a digital pulse signal into an anolog signal, for example, an analog voltage. This D-A converter 60b is connected to the distributor 18, which acts as the engine rotation speed sensor, and converts an ignition pulse signal generated at the frequency corresponding to the rotation speed of the engine 10 into an analog voltage after reshaping the waveform of the ignition pulse signal.

A comparator circuit 60c is composed of resistors 105, 106, 107, 108 and a comparator 109 and is connected to the function generator circuit 60a and to the D-A converter 60b. The comparator 109 in the comparator circuit 60c compares the signal obtained by the D-A conversion of the detected actual rotation speed of the engine 10 with a function voltage corresponding to a reference rotation speed indicative of a desired idling rotation speed of the engine 10. An output signal of "0" level appears from the comparator 109 when the detected actual rotation speed of the engine 10 is lower than the reference rotation speed, while an output signal of "1" level appears from the comparator 109 when the detected actual rotation speed of the engine 10 is higher than the reference rotation speed.

An oscillator circuit 60d is a commonly-known variable-frequency astable multivibrator employing a comparator and is composed of a comparator 110, resistors 111, 112, 113, 114, 115, 116, 117, transistors 118, 119 and a capacitor 120. The oscillation frequency of this oscillator circuit 60d is determined by an input applied from the comparator circuit 60c to the non-inverted output terminal of the comparator 110 whose inverted input terminal is connected to the CR combination of the resistor 113 and the capacitor 120. Therefore, the oscillation frequency of this oscillator circuit 60d is variable depending on the level of the output signal of the comparator circuit 60c. The oscillator circuit 60d generates a pulse signal having a low oscillation frequency as shown in (a) of FIG. 5 when the output signal of "1" level appears from the comparator 109, while it generates a pulse signal having a high oscillation frequency as shown in (c) of FIG. 5 when the output signal of "0" level appears from the comparator 109.

Figure 5:
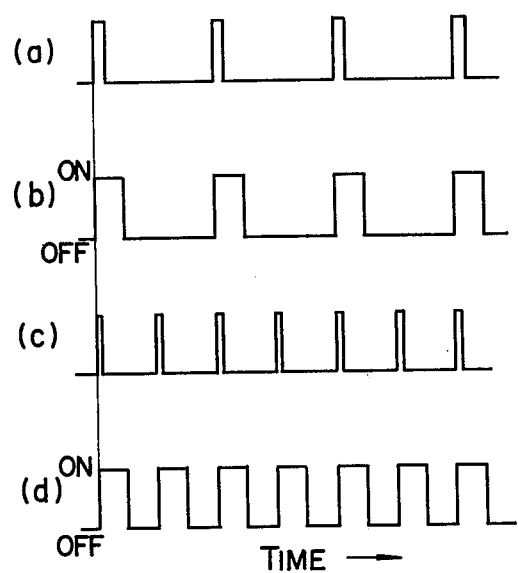

A monostable multivibrator circuit 60e is composed of resistors 121, 122, 123, 124, 125, a capacitor 126, and transistors 127, 128. The monostable multivibrator circuit 60e is triggered by the output pulse signal of the oscillator circuit 60d to deliver a pulse signal having a constant pulse width and a variable pulse interval, that is, a pulse signal having a duty ratio variable depending on the oscillation frequency of the trigger pulse signal applied from the oscillator circuit 60d. The transistor 127 is triggered by the trigger pulse signal applied from the oscillator circuit 60d. Thus, the transistor 127 is turned on and off in a manner as shown in (b) of FIG. 5 when the trigger pulse signal have the waveform shown in (a) of FIG. 5 is applied from the oscillator circuit 60d, while it is turned on and off in a manner as shown in (d) of FIG. 5 when the trigger pulse signal having the waveform shown in (c) of FIG. 5 is applied from the oscillator circuit 60d.

It will be understood that the turned-on duration of the transistor 128 is maintained constant, while its turned-off duration is determined by the emitter potential of the transistor 127 in addition to the CR combination of the resistor 123 and the capacitor 126. Thus, the lower the emitter potential of the transistor 127 triggered by the trigger pulse signal, the turned-off duration of the transistor 128 is longer. It will be seen that the oscillator circuit 60d and the monostable multivibrator circuit 60e constitute a pulse generator generating a pulse signal whose duty ratio is variable depending on the level of the output signal of the comparator circuit 60c.

A driver circuit 60f is composed of a resistor 129 and transistors 130, 131 and is actuated by the pulse signal output of the monostable multivibrator circuit 60e to control the energization of the electromagnetic coil 52 of the electromagnetic valve 51.

A secondary air increasing circuit 60g is provided for controlling the energization of electromagnetic coil 52 independently of the energization by the driver circuit 60f and is connected to the safety switch 26 and to the air-conditioner switch 23. This secondary air increasing circuit 60g is composed of a differential circuit 133 differentiating the rising or falling waveform portion of the input signal applied from the air-conditioner switch 23 or from the safety switch 26, a monostable multivibrator 134 triggered by the output of the differential circuit 133 to deliver a rectangular pulse having a predetermined pulse width, and a transistor 135 turned on by the output of the monostable multivibrator 134.

An oscillator 60h oscillates at a predetermined oscillation frequency to generate a pulse signal having a small pulse width. When the opening of the throttle valve 16 exceeds a predetermined setting the throttle switch 24 is changed over to the dotted-line position at which the pulse signal output of the oscillator 60h is applied through the switch 24 to the base of the transistor 131 in the driver circuit 60f. On the other hand, the throttle switch 24 is kept in the solid position shown in FIG. 1 when the opening of the throttle valve 16 is less than the predetermined setting, that is, when the throttle valve 16 is nearly full closed, and the output signal of the transistor 130 is applied to the base of the transistor 131 through the throttle switch 24 kept in that position.

It will be noted that the function generator circuit 60a, the D-A converter 60b, the comparator circuit 60c, the oscillator circuit 60d, the monostable multivibrator circuit 60e and the driver circuit 60f constitute a closed-loop control circuit.

Figure 4:
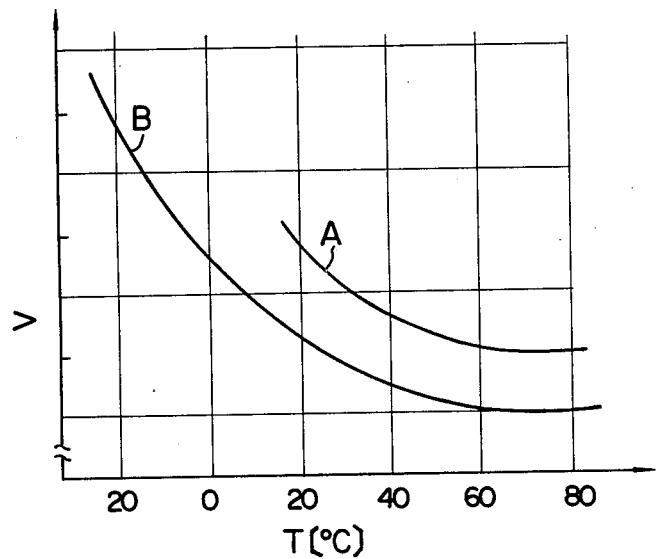

When the engine 10 is rotating at its idling rotation speed, and the throttle valve 16 is in its full closed position or in a position close to its full closed position, the opening of the air control valve 30 is subjected to the closed-loop control by the closed-loop control circuit constituting the electronic air control unit 60. In response to the application of the output signals of the warm-up sensor 19 and air-conditioner switch 23, the function generator circuit 60a generates a function voltage V which varies relative to the temperature T of engine cooling water in a manner as shown in FIG. 4. The warm-up sensor 19 employed in the apparatus according to the present invention is a thermistor as described hereinbefore. The thermistor detects the temperature T of engine cooling water, and its resistance value varies relative to the engine cooling water temperature T in a manner as shown in FIG. 3. Thus, the function voltage V generated by the function generator circuit 60a varies relative to the engine cooling water temperature T, that is, relative to the warmed-up condition of the engine 10 in a manner as shown by the curve A in FIG. 4 in the turned-on position of the air-conditioner switch 23, while it varies in a manner as shown by the curve B in FIG. 4 in the turned-off position of the air-conditioner switch 23.

The comparator circuit 60c compares the voltage signal obtained by the D-A conversion of the signal indicative of the detected actual rotation speed of the engine 10 by the D-A converter 60b with the function voltage V corresponding to the reference rotation speed indicative of the desired idling rotation speed of the engine 10. The comparator circuit 60c generates the output signal of "0" level when the detected actual rotation speed of the engine 10 is lower than the reference rotation speed, while it generates the output signal of "1" level when the former speed is higher than the latter speed.

Consequently, when the actual rotation speed of the engine 10 is lower than the reference rotation speed, the oscillator circuit 60d generates the high-frequency pulse signal shown in (c) of FIG. 5. Therefore, the monostable multivibrator circuit 60e generates the pulse signal having the high oscillation frequency and the large duty ratio shown in (d) of FIG. 5 to apply this pulse signal to the electromagnetic coil 52 of the electromagnetic valve 51 through the driver circuit 60f.

Thus, current is supplied to the electromagnetic coil 52 of the electromagnetic valve 51 for an increased total length of time to keep open the conduit 47 for that increased total length of time. Therefore, the atmospheric pressure is intermittently admitted into the diaphragm chamber 37 of the air control valve 30 for the increased length of time to increase the internal pressure P of the diaphragm chamber 37, with the result that the diaphragm 33 is displaced downward in FIG. 1, and the air flow area between the valve member 35 and the associated valve seat 36 is increased by the downward displacement of the valve member 35. In other words, the opening of the air control valve 30 is now increased.

Consequently, the amount of secondary air supplied to the engine 10 while bypassing the throttle valve 16 increases, and the associated operation of the air flow meter 12 increases the amount of fuel injected from the fuel injection valves 15. Thus, when the detected actual rotation speed of the engine 10 is lower than the reference rotation speed indicative of the desired idling rotation speed of the engine 10, the amounts of air and fuel, that is, the amount of the air-fuel mixture supplied to the engine 10 is increased to increase the rotation speed of the engine 10.

On the other hand, when the detected actual rotation speed of the engine 10 is higher than the reference rotation speed indicative of the desired idling rotation speed of the engine 10, the oscillator circuit 60c generates the low-frequency pulse signal shown in (a) of FIG. 5, and the monostable multivibrator circuit 60e generates the pulse signal having the low oscillation frequency and the small duty ratio shown in (b) of FIG. 5, with the result that current is supplied to the electromagnetic coil 52 of the electromagnetic valve 51 for a decreased total length of time to keep open the conduit 47 for that decreased total length of time. Consequently, the atmospheric pressure is admitted into the diaphragm chamber 37 of the air control valve 30 for the decreased total length of time, and the negative pressure or vacuum admitted through the conduit 49 and orifice 50 acts to lower the internal pressure P of the diaphragm chamber 37. The diaphragm 33 is displaced upward in FIG. 1, and the air flow area between the valve member 35 and the valve seat 36 is decreased by the upward displacement of the valve member 35. In other words, the opening of the air control valve 30 is now decreased. Thus, the amount of secondary air supplied to the engine 10 while bypassing the throttle valve 16 decreases gradually to decrease the rotation speed of the engine 10.

Figure 6:
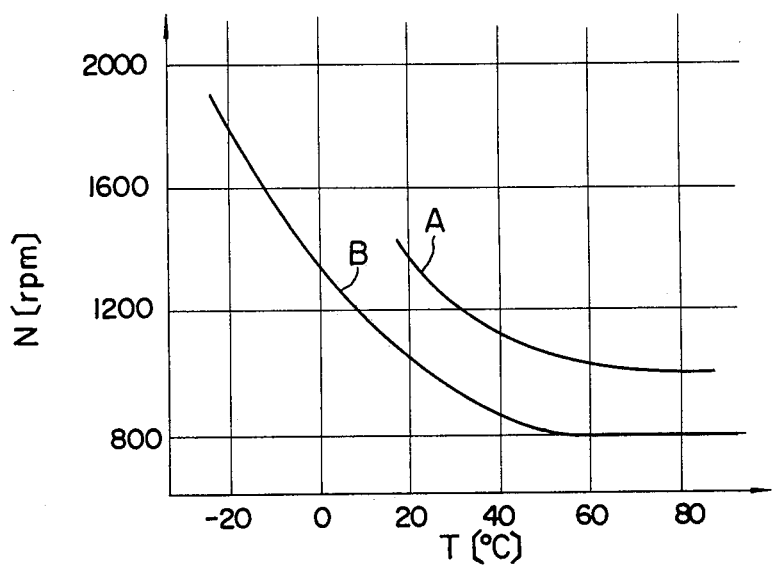

It will be seen from the above description that the rotation speed of the engine 10 can be maintained at the reference rotation speed corresponding to the function voltage V by controlling the energization of the electromagnetic coil 52 of the electromagnetic valve 51 depending on the level of the function voltage V. The function voltage V varies relative to the engine cooling water temperature T in a manner as shown in FIG. 4, as described already. This function voltage V has a high level when the engine 10 is not sufficiently warmed up and the temperature T of engine cooling water is still low, as when the engine 10 is started from its cold state. Due to the apperance of the high function voltage V in the cold state of the engine 10, the rotation speed of the engine 10 is maintained high as shown in FIG. 6 so that the engine 10 can stably rotate while overcoming the friction provided by, for example, the high viscosity of the engine lubricating oil. As the engine 10 is gradually warmed up to increase the temperature T of engine cooling water, the function voltage V is gradually lowered, and the rotation speed of the engine 10 approaches gradually the normal idling rotation speed as shown in FIG. 6.

Due to the fact that the detected actual rotation speed of the engine 10 is continuously compared with the reference rotation speed indicative of the desired idling rotation speed of the engine 10 for the closed-loop control by the closed-loop control circuit constituting the electronic air control unit 60, the rotation speed of the engine 10 can be controlled to be always equal to the designed or desired idling rotation speed indicated by the level of the function voltage V even when a specific kind of engine lubricating oil is replaced by another kind of engine lubricating oil having a viscosity different from that of the former.

In the turned-on position of the air-conditioner switch 23, the function voltage V varies in a manner as shown by the curve A in FIG. 4, and it will be seen from comparison between the curve A in FIG. 4, and it will be seen from comparison between the curves A and B in FIG. 6, the idling rotation speed of the engine 10 represented by the curve A in FIG. 6 is maintained higher than that given by the curve B in FIG. 6. Thus, the compressor 28 of the vehicle's air-conditioner is driven at a sufficiently high rotation speed so that the vehicle's air-conditioner can satisfactorily operate in spite of the fact that the engine 10 is rotating at its idling rotation speed.

When an abrupt change occurs in the load of the engine 10 in its idling condition, as when the air-conditioner switch 23 is turned on to add the compressor 28 to the load of the engine 10, or when the shift lever of the automatic transmission 25 is shifted from the "P" or "N" range to the "D" range in the idling condition of the engine 10, the rotation speed of the engine 10 will be momentarily decreased since the air control valve 30 which controls the flow rate of secondary air is not so quickly responsive to such an abrupt change in the load of the engine 10.

According to the present invention, however, the input signal of "1" level is applied to the secondary air increasing circuit 60g from the air-conditioner switch 23 or from the safety switch 26 as soon as the air-conditioner switch 23 is turned on or as soon as the shift lever of the automatic transmission 25 is shifted to the "D" range to turn on the safety switch 26. This input signal of "1" level is differentiated by the differential circuit 133 in the secondary air increasing circuit 60g, and in response to the application of the output pulse from the differential circuit 133, the monostable multivibrator 134 generates a pulse having a pulse width of about 0.1 to 0.5 seconds. The transistor 135 is turned on in response to the application of the pulse having such a pulse width so as to supply current to the electromagnetic coil 52 of the electromagnetic valve 51.

Therefore, the air control valve 30 is forcedly closed independently of the closed-loop control to increase the amount of secondary air supplied to the engine 10 thereby preventing the undesirable momentary decrease of the rotation speed of the engine 10. Thus, the vehicle driver would not feel uneasy or unpleasant, and the engine 10 is prevented from stalling.

As soon as the throttle valve 16 is opened to shift the operating condition of the engine 10 from the idling condition to the normal loaded condition, the throttle switch 24 is changed over to the dotted-line position connecting the oscillator 60h to the transistor 131 in the driver circuit 60h and the electromagnetic valve 51 is released from the closed-loop control by the electronic air control unit 60. In this case, the electromagnetic coil 52 of the electromagnetic valve 51 is energized by the pulse signal of predetermined frequency generated by the oscillator 60h to maintain the opening of the air control valve 30 at the predetermined small setting.

In the first embodiment of the present invention above described, the oscillator circuit 60d connected to the comparator circuit 60c is adapted to generate a high-frequency output signal and a low-frequency output signal depending on the level of the output signal of the comparator circuit 60c. However, the output signal of the comparator circuit 60c may be applied to the oscillator circuit 60d through an integrator circuit so that the oscillation frequency of the oscillator circuit 60d may be continuously varied.

Figure 7:
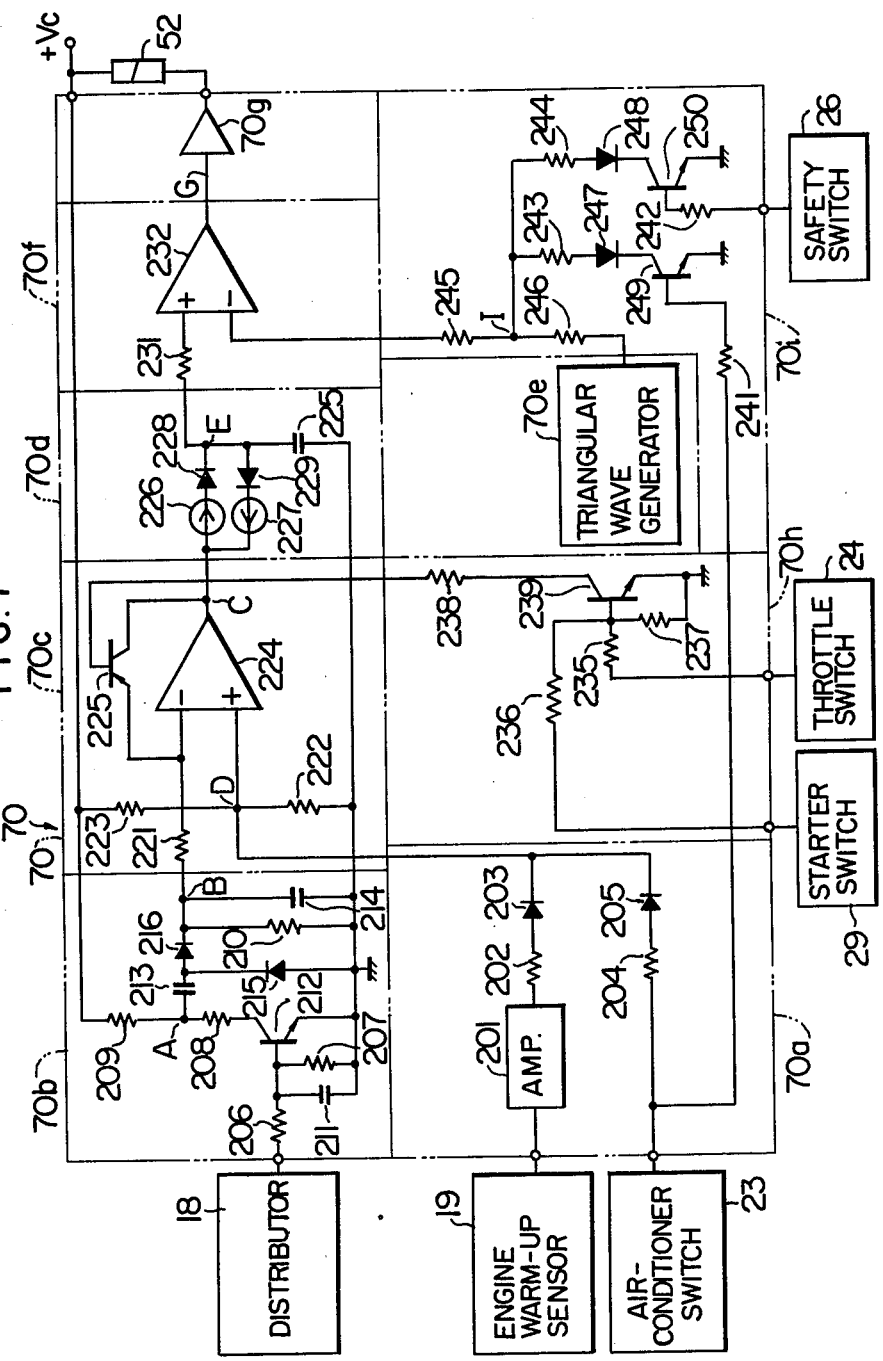
FIG. 7 is an electrical circuit diagram showing the detailed structure of another form of the electronic air control unit.

FIG. 7 shows another electronic air control unit 70 preferably employed in the apparatus according to the present invention, in which a triangular voltage generated by a triangular waveform generator is used for varying the pulse width of the pulse signal applied to the electromagnetic coil 52 of the electromagnetic valve 51.

The structure of the electronic air control unit 70 will now be described in detail with reference to FIG. 7. Referring to FIG. 7, a function generator circuit 70a is composed of an amplifier 201 of known structure, resistors 202, 204, and diodes 203, 205. The output signal of the warm-up sensor 19 and the on-off signal of the air-conditioner switch 23 are applied to the function generator circuit 70a. The output signal of the warm-up sensor 19 is amplified by the amplifier 201 to provide a voltage signal indicative of the warmed-up condition of the engine 10. This voltage signal is applied through the resistor 202 and diode 203 to a first comparator circuit 70c, while the on-off signal of the air-conditioner switch 23 is applied through the resistor 204 and diode 205 to the first comparator circuit 70c, thereby applying a function voltage V of reference level D to the first comparator circuit 70c.

A D-A converter circuit 70b is composed of resistors 206, 207, 208, 209, 210, capacitors 211, 213, 214, a transistor 212, and diodes 215, 216. The ignition distributor 18 applies the pulse signal synchronous with the rotation of the engine 10 to the D-A converter circuit 70b. The waveform reshaping section constituted by the resistors 206 to 209 and the transistor 212 reshapes the waveform of the input signal to provide a reshaped pulse signal as shown in (a) of FIG. 8. This reshaped pulse signal is then turned by the combination of the capacitors 213, 214, diodes 215, 216 and resistor 210 into a voltage waveform as shown in (b) of FIG. 8 in which a sawtooth voltage waveform having a frequency synchronous with that of the input pulse signal (the intermittent signal) indicative of the rotation of the engine 10 is superposed on a DC voltage component proportional to the rotation speed of the engine 10. The voltage having the waveform shown in (b) of FIG. 8 appears at the output terminal B of the D-A converter circuit 70b.

The first comparator circuit 70c is composed of resistors 221, 222, 223, a comparator 224, and a transistor 225 connected across the inverted input terminal and the output terminal of the comparator 224, and compares the output voltage of the D-A converter circuit 70b with the function voltage V applied from the function generator circuit 70a. This function generator circuit 70a has also an output characteristic as shown in FIG. 4, and its output voltage becomes higher with the decrease in the temperature T of engine cooling water. The function output voltage V of the function generator circuit 70a varies in a manner as shown by the curve B in FIG. 4 in the turned-off position of the air-conditioner switch 23, while it varies in a manner as shown by the curve A in FIG. 4 in the turned-on position of the air-conditioner switch 23. An output signal C of "1" level as shown in (c) of FIG. 8 appears from the first comparator circuit 70c during only the period of time in which the output voltage of the D-A converter circuit 70b applied to the inverted input terminal of the comparator 224 is lower than the function voltage V of reference level D applied to the non-inverted input terminal of the comparator 224.

An integrator circuit 70d is composed of a capacitor 225, regulated current charge-discharge elements 226, 227 and diodes 228, 229, and the regulated current charge or discharge of the capacitor 225 occurs depending on the level of the output signal C of the first comparator circuit 70c. This integrator circuit 70d provides an output voltage E which varies in a manner as shown by the broken curve E in (d) of FIG. 8. More precisely, the output voltage E increases due to the regulated current charge of the capacitor 225 during the period of time in which the output signal C of the first comparator circuit 70c is maintained in its "1" level, while the output voltage E decreases due to the regulated current discharge of the capacitor 225 during the period of time in which the signal C is maintained in its "0" level.

Figure 8:
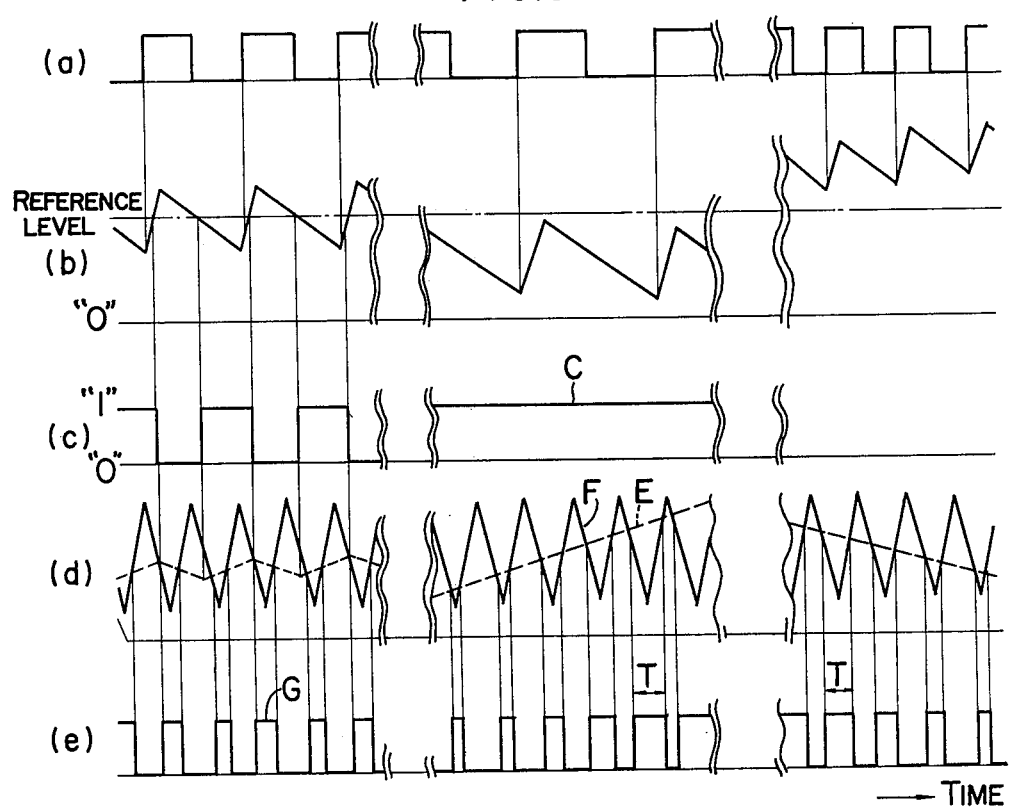
FIGS. 8 and 9 are graphs illustrating the operation of the electronic air control unit shown in FIG. 7.

A triangular waveform generator 70e is of the known kind which generates a triangular voltage waveform F having a predetermined period as shown by the solid curve F in (d) of FIG. 8.

A second comparator circuit 70f composed of an input resistor 231 and a comparator 232 compares the output voltage E of the integrator circuit 70d with the triangular waveform voltage F applied from the triangular waveform generator 70e. An output pulse signal G as shown in (e) of FIG. 8 appears from the second comparator circuit 70f and has its "1" level only when the level of the output voltage E of the integrator circuit 70d is higher than that of the triangular waveform voltage F applied from the triangular waveform generator 70e.

An amplifier circuit 70g amplifies the output pulse signal G of the second comparator circuit 70f, and the amplified output is supplied to the electromagnetic coil 52 of the electromagnetic valve 51.

A change-over instruction circuit 70h is composed of resistors 235, 236, 237, 238 and a transistor 239. The signal generated in response to the change-over of the position of the throttle switch 24, that is, the signal which takes its "0" level in response to the closure of the throttle valve 16 and its "1" level in response to the opening of the throttle valve 16 is applied to the change-over instruction circuit 70h together with the output signal of the starter switch 29 which signal takes its "1" level only when the starter is actuated to start the engine 10. The transistor 239 is connected at its collector to the base of the transistor 225 in the first comparator circuit 70c through the resistor 238, so that, in response to the application of the input signal of "1" level from the throttle switch 24 or from the starter switch 29, the transistor 239 is turned on to turn on the transistor 225 in the first comparator circuit 70c. Thus, the comparator 224 in the first comparator circuit 70c acts now as an impedance transformer.

A secondary air increasing circuit 70i is composed of resistors 241, 242, 243, 244, 245, 246, diodes 247, 248, and transistors 249, 250, and acts to lower the mean level of the triangular waveform voltage output F of the triangular waveform generator 70e in response to the application of the on-off signal from the air-conditioner switch 23 or from the safety switch 26.

The D-A converter circuit 70b, the first comparator circuit 70c, the integrator circuit 70d, the triangular waveform generator 70e, the second comparator circuit 70f and the amplifier circuit 70g constitute a closed-loop control circuit.

Figure 9:
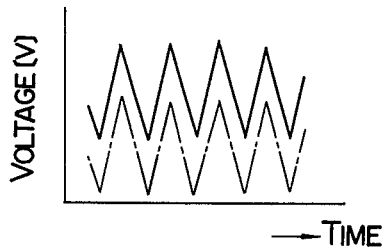

The operation of the electronic air control unit 70 will be described with reference to FIGS. 7, 8 and 9. In the idling stage, the throttle valve 16 is closed, and the engine 10 is rotating at an idling rotation speed. When the idling rotation speed is lower than the reference rotation speed corresponding to the reference level D determined by the function generator circuit 70a in the electronic air control unit 70, the output level of the D-A converter circuit 70b is also lower than this reference level D. Thus, the output level of the D-A converter circuit 70b shown in the middle portion in (b) of FIG. 8 is always lower than the reference level D, and even if the output level of the D-A converter circuit 70b exceeds the reference level D, it is limited to a very short length of time. Therefore, the output signal C of the first comparator circuit 70c takes continuously its "1" level as shown in the middle portion in (c) of FIG. 8, and even if this signal C takes its "0" level, it is limited to a very short length of time. Consequently, the output voltage E of the integrator circuit 70d increases gradually in a manner as shown by the broken curve portion in the middle portion in (d) of FIG. 8. This results in an increase in the period of time T in which the level of the output voltage E of the integrator circuit 70d applied to the second comparator circuit 70f is higher than that of the triangular waveform voltage F applied from the triangular waveform generator 70e. That is, the period of time T of "1" level or the pulse width in the output pulse signal G of the comparator 232 increases as shown in (e) of FIG. 8. The electromagnetic coil 52 of the electromagnetic valve 51 is energized for an increased length of time to increase the opening of the air control valve 30, so that the amount of secondary air bypassing the throttle valve 16 is increased to increase the rotation speed of the engine 10.

When, on the other hand, the rotation speed of the engine 10 is higher than the reference rotation speed, the output level of the D-A converter circuit 70b is always higher than the reference level D representing the reference rotation speed as seen in the right-hand portion in (b) of FIG. 8, and even if the former becomes lower than the latter, it is limited to a very short length of time. Thus, the output signal C of the first comparator circuit 70c takes continuously its "0" level as shown in the right-hand portion in (c) of FIG. 8, and even if the signal C takes its "1" level, it is limited to a very short length of time. Consequently, the output voltage E of the integrator circuit 70d decreases gradually in a manner as shown by the broken curve portion in the right-hand portion in (d) of FIG. 8. This results in a decrease in the period of time T in which the level of the output voltage E of the integrator circuit 70d applied to the second comparator circuit 70f is higher than that of the triangular waveform voltage F applied from the triangular waveform generator 70e. That is, the period of time T of "1" level or the pulse width in the output pulse signal G of the comparator 232 decreases. The electromagnetic coil 52 of the electromagnetic valve 51 is energized for a decreased total length of time to decrease the opening of the air control valve 30, so that the amount of secondary air bypassing the throttle valve 16 is decreased to decrease the rotation speed of the engine 10.

Thus, in the idling stage in which the throttle valve 16 is closed, the rotation speed of the engine 10 is controlled by the electronic air control unit 70 in such a manner that the rotation speed is always equal to the reference rotation speed corresponding to the function voltage V of reference level D determined by the function generator circuit 70a. The function voltage V of reference level D determining this reference rotation speed is variable depending on the output of the warm-up sensor 19 as shown in FIG. 4 in which it will be seen that the function voltage V increases with the decrease in the temperature T of engine cooling water. Thus, the rotation speed of the engine 10 is higher at a lower temperature T of engine cooling water during warming up the engine 10, so that the engine 10 can stably rotate at the idling rotation speed in relation to the temperature T of engine cooling water. When the air-conditioner switch 23 is turned on to add the compressor 28 of the vehicle's air-conditioner such as the cooler to the load of the engine 10, the turned-on signal of this air-conditioner switch 23 is applied to the function generator circuit 70a, and the function voltage circuit 70a acts to raise the reference level D thereby shifting the reference rotation speed to a correspondingly higher level. It is therefore possible to obviate such a problem that the capacity of the compressor 28 is not fully developed, and also to obviate such another problem that the engine 10 tends to stall.

Then, when the throttle valve 16 is opened to shift the operating condition of the engine 10 from the idling condition to the loaded condition, the transistor 239 in the change-over instruction circuit 70h is turned on to turn on the transistor 225 in the first comparator circuit 70c, so that the comparator 224 operates now as an impedance transformer. Consequently, the output voltage of the function generator circuit 70a, that is, the function voltage V of reference level D appears intact as the output of the impedance transformer, and the output voltage E of the integrator circuit 70d has also a level close to the reference level D. As a consequence, the pulse signal G having a constant pulse width corresponding to the reference level D of the function voltage V generated by the function generator circuit 70a appears from the second comparator circuit 70f, so that the constant amount of secondary air corresponding to the temperature T of engine cooling water can be supplied from the air control valve 30 to the engine 10 while bypassing the throttle valve 16.

In the electronic air control unit 70 shown in FIG. 7, the output signal of "1" level appears from the starter switch 29 in response to the actuation of the starter for starting the engine 10. Thus, as in the aforementioned case in which the throttle valve 16 is opened to place the engine 10 in the loaded condition, the transistor 239 in the change-over instruction circuit 70h is turned on to turn on the transistor 225 in the first comparator circuit 70c thereby causing the comparator 224 to operate as the impedance transformer, and the output voltage E of the integrator circuit 70d has a level close to the output level D of the function generator circuit 70a. Therefore, as in the aforementioned case, the pulse signal G having a constant pulse width corresponding to the warmed-up condition of the engine or the temperature T of engine cooling water appears from the second comparator circuit 70f, so that the constant amount of secondary air corresponding to the warmed-up condition of the engine 10 can be supplied to the engine 10 to improve the starting performance of the engine 10.

As soon as the air-conditioner switch 23 is turned on or as soon as the safety switch 26 is turned on in response to the shift of the shift lever to the "D" range, its output signal of "1" level is applied from the switch 23 or 26 to the secondary air increasing circuit 70i. This signal of "1" level is applied to the transistor 249 or 250 through the resistor 241 or 242 to turn on the transistor 249 or 250.

Consequently, the terminal I of the secondary air increasing circuit 70i is grounded through the resistor 243 or 244 and through the diode 247 or 248. This results in a decrease of the overall level of the triangular waveform voltage F appearing at the terminal I, as shown by the one-dot chain curve in FIG. 9.

Therefore, the period of time T of "1" level or the pulse width in the output pulse signal G of the comparator 232 increases in a manner substantially similar to the increase in the level of the output voltage E of the integrator circuit 70d. The electromagnetic coil 52 of the electromagnetic valve 51 is energized for an increased total length of time thereby quickly increasing the opening of the air control valve 30. The amount of secondary air is thus sharply increased in quick response to the turn-on of the air-conditioner switch 23 or safety switch 26 thereby preventing the undesirable momentary decrease of the rotation speed of the engine 10.

In the apparatus shown in FIG. 1, the internal negative pressure or vacuum of the intake manifold 14 disposed downstream of the throttle valve 16 is admitted directly into the diaphragm chamber 37 of the air control valve 30. In such an arrangement, the internal pressure of the intake manifold 14 in the racing or decelerating condition of the engine 10 will be considerably lower than when the engine 10 is placed in the idling condition. In such a case, the relative internal pressure of the diaphragm chamber 37 will be lower than that in the idling condition even when the pulse signal of the same frequency is applied to energize the electromagnetic coil 52 of the electromagnetic valve 51. When the engine 10 is placed in the idling condition again immediately after such a racing or decelerating condition, the amount of secondary air flowing through the air control valve 30 will still be smaller than the desired amount due to the narrowed opening of the valve 30. That is, during the transition from the racing or decelerating condition to the idling condition, the rotation speed of the engine 10 may be extremely decreased to such an extent that stalling may result.

Figure 10:
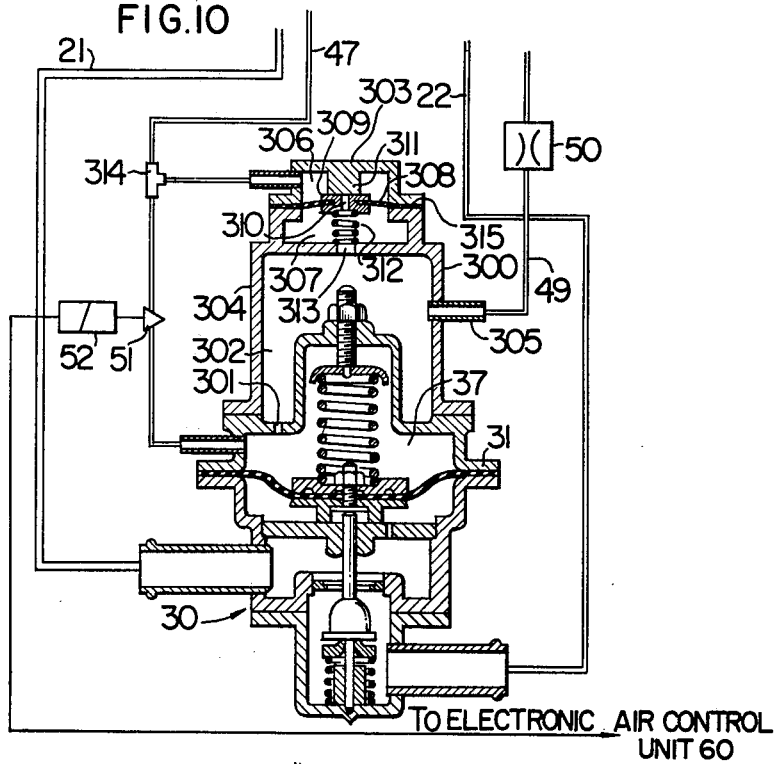
FIG. 10 is a schematic sectional view of part of another form of the pressure control unit together with the air control valve shown in FIG. 1.

FIG. 10 shows another form of the pressure control unit which obivates the above trouble.

Referring to FIG. 10, the pressure control unit 300 is designed so that the pressure admitted from the intake manifold 14 can be maintained at a value higher than a selected setting which is, for example, −350 mmHg. The pressure control unit 300 is constructed integrally with the air control valve 30. The pressure control unit 300 comprises a negative pressure or vacuum chamber 302 and a pressure control valve 303. The pressure at a position downstream of the throttle valve 16 is admitted into the vacuum chamber 302 from the intake manifold 14 to be then admitted into the diaphragm chamber 37 of the air control valve 30 through a port 301. The pressure control valve 303 acts to regulate the internal pressure of this vacuum chamber 302 by introducing the atmospheric pressure therein. The vacuum chamber 302 defined between a valve housing portion 304 of the pressure control valve 303 and the valve housing portion 31 of the air control valve 30, and the vacuum is admitted therein via a supply pipe 305.

The pressure control valve 303 is of the type in which a diaphragm 308 is displaced by the pressure difference between an atmospheric pressure chamber 306 and a spring chamber 307, and the axial displacement of the diaphragm 308 toward and away from a stopper 311 is utilized to close and open a port 310 formed in the hub 309 of the diaphragm 308. The diaphragm 308 is sandwiched at its outer peripheral edge between valve housing portions 304 and 315, and its hub 309 is normaly biased toward the stopper 311 by a compression spring 312 housed within the spring chamber 307.

Therefore, when the internal pressure of the spring chamber 307 communicating with the vacuum chamber 302 through a port 313 decreases to a value lower than a predetermined setting provided by the force of the compression spring 312, the diaphragm 308 is displaced downward in FIG. 10, and its hub 309 is urged away from the stopper 311, with the result that the atmospheric pressure is admitted into the spring chamber 307 through the port 310 thereby increasing the internal pressure of the spring chamber 307, hence, that of the vacuum chamber 302. The atmospheric pressure chamber 306 is connected to the conduit 47 by a three-way pipe 314 to receive the atmospheric pressure by way of the conduit 47. The electromagnetic valve 51 is disposed midway of the conduit 47 at a position downstream of the three-way pipe 314 so as to open or close this conduit 47 for controlling the internal pressure of the diaphragm chamber 37 thereby controlling the opening of the air control valve 30.

The pressure control unit 300 having the structure above described is disposed downstream of the orifice 50. When the internal pressure of the vacuum chamber 302 decreases to a value lower than the predetermined setting, the diaphragm 308 is displaced downward in FIG. 10 to permit admission of the atmospheric pressure of the atmospheric pressure chamber 306 into the spring chamber 307 through the port 310, thence, into the vacuum chamber 302 through the port 313 so as to maintain the internal pressure of the vacuum chamber 302 at a value higher than the predetermined setting. Thus, the pressure higher than the predetermined value is supplied from the vacuum chamber 302 to the diaphragm chamber 37 through the port 301, so that any substantial change does not occur in the opening of the air control valve 30 even when the internal pressure of the intake manifold 14 is subjected to an excessive drop.

Therefore, any excessive decrease of the rotation speed of the engine 10 giving rise to stalling of the engine 10 does not occur even during the transition from the racing or decelerating condition to the idling condition.

Figure 11:
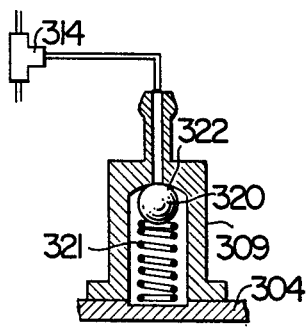
FIG. 11 is a schematic sectional view of part of a modification of the pressure control unit shown in FIG. 10.

In the embodiment shown in FIG. 10, the pressure control valve 303 of the diaphragm type is employed to constitute the important element of the pressure control unit 300. However, this pressure control valve may of another type as shown in FIG. 11, in which a ball 320 and a compression spring 321 are housed within the valve housing portion 309, and the ball 320 is urged toward and away from an associated valve seat 322 to open or close the valve.

In the aforementioned embodiments of the present invention, the oscillator circuit 60d connected to the comparator circuit 60c is adapted to generate a high-frequency output signal and a low-frequency output signal depending on the level of the output signal of the comparator circuit 60c. However, the output signal of the comparator circuit 60c may be applied to the oscillator circuit 60d through an integrator circuit so that the osicllation frequency of the oscillator circuit 60d may be continuously varied.

In the aforementioned embodiments, the oscillator circuit 60d generating a pulse signal having a variable frequency and the monostable multivibrator circuit 60e generating a pulse signal having a constant pulse width have been used as a pulse generator means for controlling the energization of the electromagnetic coil 52 of the electromagnetic valve 51 by a pulse signal having a constant pulse width but having a variable frequency. However, an astable multivibrator generating a pulse signal having a constant frequency and a monostable multivibrator generating a pulse signal having a variable pulse width may be used for controlling the energization of the electromagnetic coil 52 of the electromagnetic valve 51 by a pulse signal having a constant frequency but having a variable pulse width. It is apparent that any one of other suitable types of pulse generators may also be used.

A sensor sensing the temperature of engine cooling water has been used as the warm-up sensor in the aforementioned embodiments. However, any other suitable sensor such as a sensor sensing the temperature of engine lubricating oil or a sensor sensing the temperature of the cylinder block may be used. Also, a starting timer employing the combination of a bimetal element and an electric heater may be used.

Further, although the warmed-up condition of the engine and the on-off of the compressor to the engine has been used as the parameters for determining the function voltage level, another operating condition of the engine may also be used as an additional parameter for determining the function voltage level.

What we claim is:

1. In an automotive engine system having a throttle valve for controlling the amount of air flowing into an engine therethrough and fuel supply means for supplying said engine with fuel in accordance with the amount of air flowing into said engine, an apparatus comprising:
    an air valve for controlling the amount of additional air flow bypassing said throttle valve from upstream to downstream of said throttle valve;
    an electromagnetic mechanism coupled to said air valve, for controlling an opening degree of said air valve in response to an input electric signal;
    temperature sensor means for sensing the temperature of said engine;
    speed sensor means for sensing the rotation speed of said engine;
    an air-conditioner switch means for detecting whether a compressor of an air-conditioner is coupled to said engine as a load of said engine;
    a transmission switch means for detecting that an automatic transmission for said engine has changed its shift position from a neutral position to a drive position, and generating a detection output signal indicative of said shift;
    reference generating means for generating a reference rotation speed signal indicative of a desired idling rotation speed of said engine in response to the temperature sensed by said temperature sensor means and a detection output signal of said air-conditioner switch means;
    comparing means for comparing the rotation speed sensed by said speed sensor means with said reference rotation speed generated by said reference generating means; and
    driver means, responsive to an output signal of said comparing means, for generating the input signal to said electromagnetic valve to increase and decrease the amount of the additional air flow so that the idling rotation speed becomes the desired one, said driver means further responsive to either one of the detection output signals of said air conditioner switch means and said transmission switch means, for generating the input signal to said electromagnetic mechanism to increase the amount of the additional air flow independent of the output signal of said comparing means when said air-conditioner switch means detects that said compressor is coupled to said engine, or when said transmission switch means detects that said automatic transmission has changed its shift position to the drive position.

2. An apparatus according to claim 1, wherein said comparing means includes:
    a comparator having a non-inverted input terminal, an inverted input terminal and an output terminal; and
    a switch element connected between the inverted terminal and the output terminal of said comparator;
    and wherein said apparatus further comprises starter switch means for detecting the starting of said engine and generating in response thereto a detection output signal to be supplied to said switch element during the starting of said engine, during which said switch element is turned on in response to the detection output signal of said starter switch means so that said comparator operates as an impedance converter.

3. An apparatus according to claim 1, wherein said driver means includes:
    integrator means for integrating the output signal of said comparing means, the integration polarity being changed in accordance with the output signal of said comparing means;
    wave generator means for generating a waveform having a predetermined period; and
    pulse generator means connected to said integrator means and said wave generator means, for generating a pulse signal having a duty ratio proportional to the output signal of said integrating means by modulating the waveform of said wave generator means with an output signal of said integrator means.

4. An apparatus according to claim 3, wherein the output level of said wave generator means is varied with either one of the detection output signals of said air-conditioner switch means and said transmission switch means.

5. A stall control system for an engine system having a throttle valve for controlling the amount of air flowing therethrough and into said engine and fuel supply means for supplying fuel to said engine at a rate in accordance with the amount of air flowing into said engine, said stall control system comprising:

means for bypassing air around said throttle valve including an air valve for controlling the amount of additional air flow bypassing said throttle valve from upstream to downstream of said throttle valve;

an air-conditioner switch means for detecting whether a compressor of an air-conditioner is coupled to said engine as an auxiliary load of said engine and generating an air-conditioner signal indicative thereof;

a transmission switch means for detecting that an automatic transmission for said engine has shifted from a neutral position to a drive position, and generating a transmission signal indicative thereof;

first means responsive to said air-conditioner signal for opening said air valve to increase the flow of additional air when the air-conditioner compressor is coupled to said engine as an auxiliary load, thereby preventing an engine stall;

second means responsive to said transmission signal for opening said air valve to increase the flow of additional air when the transmission shifts from neutral to a drive position placing a primary load on said engine, thereby preventing an engine stall, means for sensing the temperature of said engine and generating a temperature signal indicative thereof;

means for sensing the rotational speed of said engine and generating a speed signal indicative thereof;

reference generating means for generating a reference rotational speed signal indicative of a desired idling rotational speed of said engine in response to said temperature signal and said air-conditioner signal; and control means, responsive to said speed signal and said reference rotational speed signal for generating a signal for controlling said air valve to increase and decrease the amount of the additional air flow so that the idling rotation speed of said engine becomes the desired idling rotational speed of said engine as determined by said reference generating means, said first means and said second means controlling the amount of the additional air flow independent of the control means so as to provide override control of said air valve by said first and second means.

6. A stall control sysstem according to claim 5 further including starter switch means for detecting the starting of said engine and generating an engine start signal indicative thereof, said start signal coupled to said control means, said control means being responsive thereto for controlling said air valve.

7. In an automotive engine system having a throttle valve for controlling the amount of air flowing therethrough and into an engine and fuel supply means for supplying fuel to the engine in accordance with the amount of air flowing into said engine, an apparatus comprising:

an air valve for controlling the amount of additional air flow bypassing said throttle valve from upstream to downstream of said throttle valve;

an electromagnetic mechanism coupled to said air valve, for controlling an opening degree of said air valve in response to a control signal;

temperature sensor means for sensing the temperature of said engine;

speed sensor means for sensing the rotation speed of said engine;

air-conditioner switch means for detecting whether a compressor of an air-conditioner is coupled to said engine as a load of said engine;

a transmission switch means for (a) detecting that an automatic transmission for said engine has changed its shift position from a neutral position to a drive position, and (b) generating a detection output signal indicative of said shift; and an electronic air control unit being coupled to said temperature sensor means, speed sensor means, air-conditioner switch means and transmission switch means, for receiving signals therefrom and also being coupled to said electromagnetic mechanism for providing said control signal thereto, said electronic air control unit including means for (a) computing a reference rotation speed indicative of a desired idling rotation speed of said engine in response to the signals from said temperature sensor means and said air-conditioner switch means, (b) computing an actual rotation speed of said engine in response to the signal from said speed sensor means, (c) comparing the computed actual rotation speed with the computed reference rotation speed and generating a comparison result, (d) in response to the comparison result, generating said control signal for increasing or decreasing the amount of the additional air flow so that the idling rotation speed becomes the desired one, (e) in response to either one of the signals from said air-conditioner switch means and said transmission switch means, generating a control signal to said electromagnetic mechanism to increase the amount of the additional air flow independent of the comparison result when said air-conditioner switch means detects that said compressor is coupled to said engine, or when said transmission switch means detects that said automatic transmission has changed its shift position to the drive position.

* * * * *